United States Patent [19]

Hagenes

[11] Patent Number: 5,118,413
[45] Date of Patent: Jun. 2, 1992

[54] SEA OIL SCOOP WITH SEA EFFECT STABILITY HINGE

[76] Inventor: Arthur Hagenes, 899 S. Long Beach Ave., Freeport, N.Y. 11520

[21] Appl. No.: 684,182

[22] Filed: Apr. 12, 1991

[51] Int. Cl.⁵ .............................................. E02B 15/04
[52] U.S. Cl. ................................. 210/122; 210/242.3; 210/923
[58] Field of Search ...................... 210/242.3, 776, 923, 210/122

[56] References Cited

U.S. PATENT DOCUMENTS

| | | | |
|---|---|---|---|
| 3,348,690 | 10/1967 | Cornelissen | 210/923 |
| 3,612,280 | 10/1971 | Fitzgerald | 210/923 |
| 3,618,768 | 11/1971 | Brown | 210/776 |
| 3,651,943 | 3/1972 | Di Perna | 210/923 |
| 3,661,264 | 5/1972 | Peterson et al. | 210/923 |
| 3,847,816 | 11/1974 | Di Perna | 210/923 |
| 4,014,794 | 3/1977 | in't Veld | 210/923 |
| 4,795,567 | 1/1989 | Simpson et al. | 210/923 |
| 5,043,065 | 8/1991 | Propp | 210/923 |

FOREIGN PATENT DOCUMENTS 7705258  11/1978  Netherlands .

Primary Examiner—Peter Hruskoci
Assistant Examiner—Christopher Upton
Attorney, Agent, or Firm—Michael I. Kroll

[57] ABSTRACT

A sea oil scoop is provided for a vessel having a hull in a body of oil contaminated water, which consists of a housing having an oil inlet port. A mechanism is for hinging the housing to the side of the hull of the vessel. The housing can be angularly positioned with respect to the hull of the vessel, to gather the oil from the top surface of the body of oil contaminated water into the oil inlet port, when in one instance the vessel travels forward and in another instance when the vessel is anchored and the current in the water drives the oil past the vessel.

15 Claims, 5 Drawing Sheets

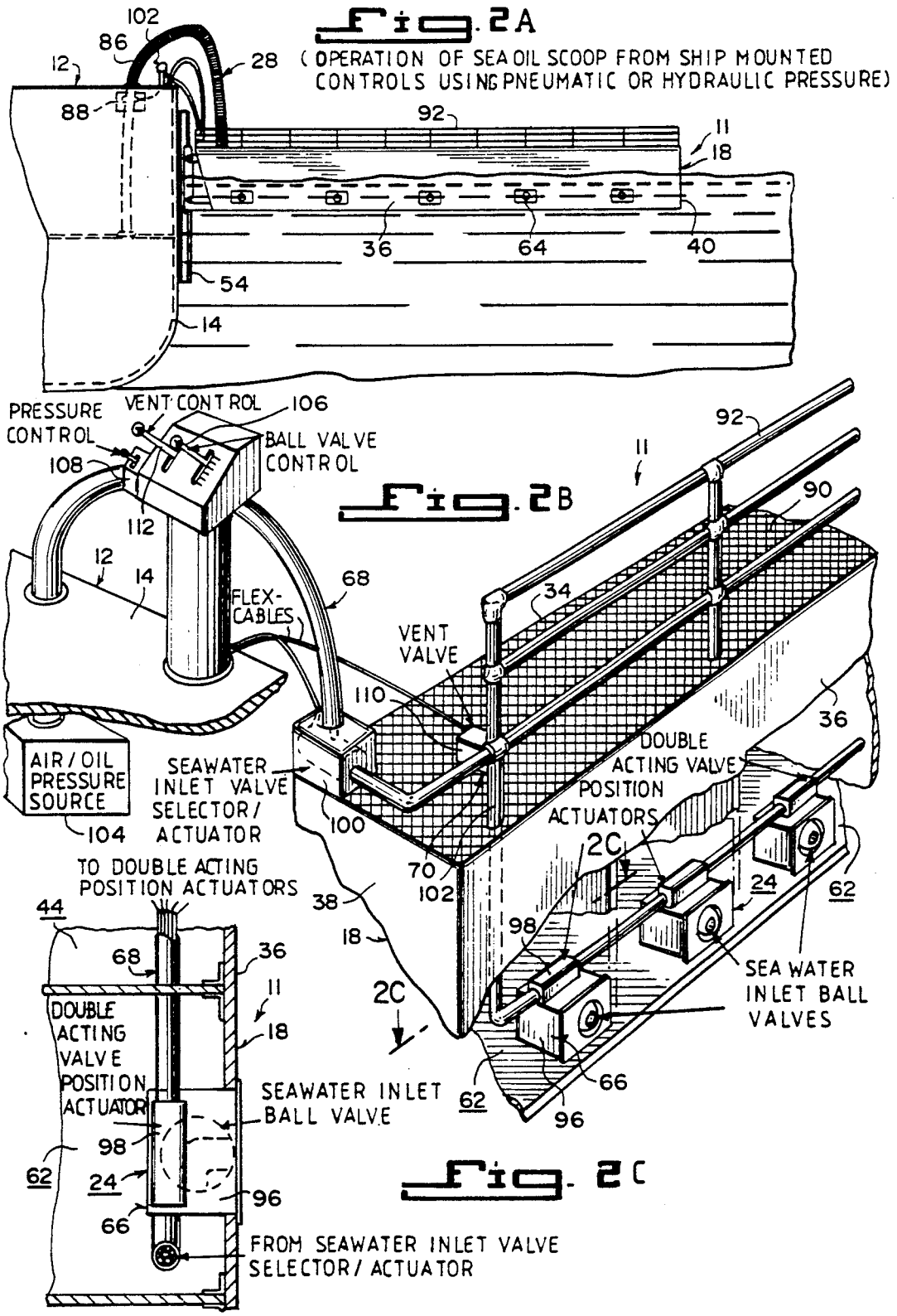

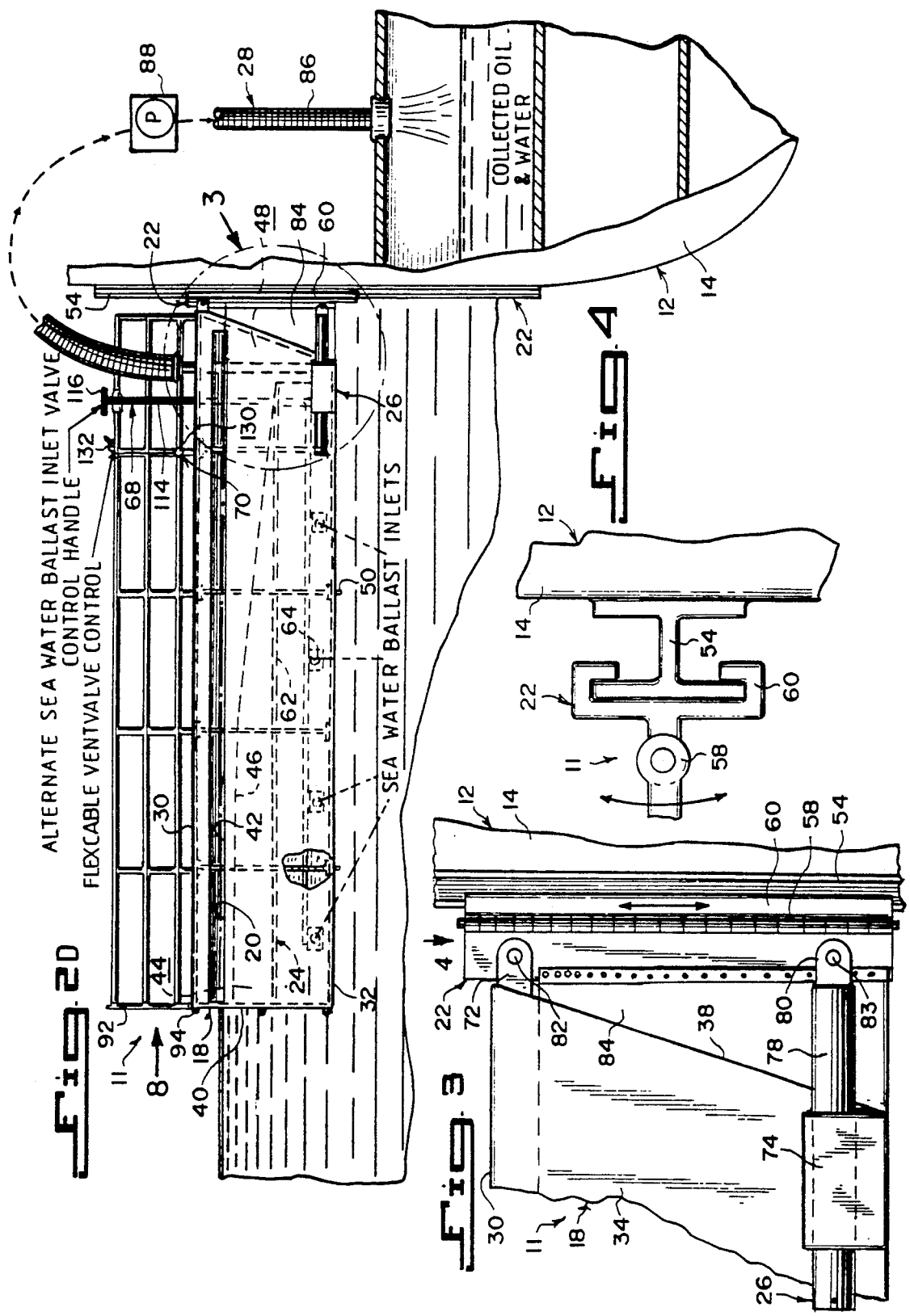

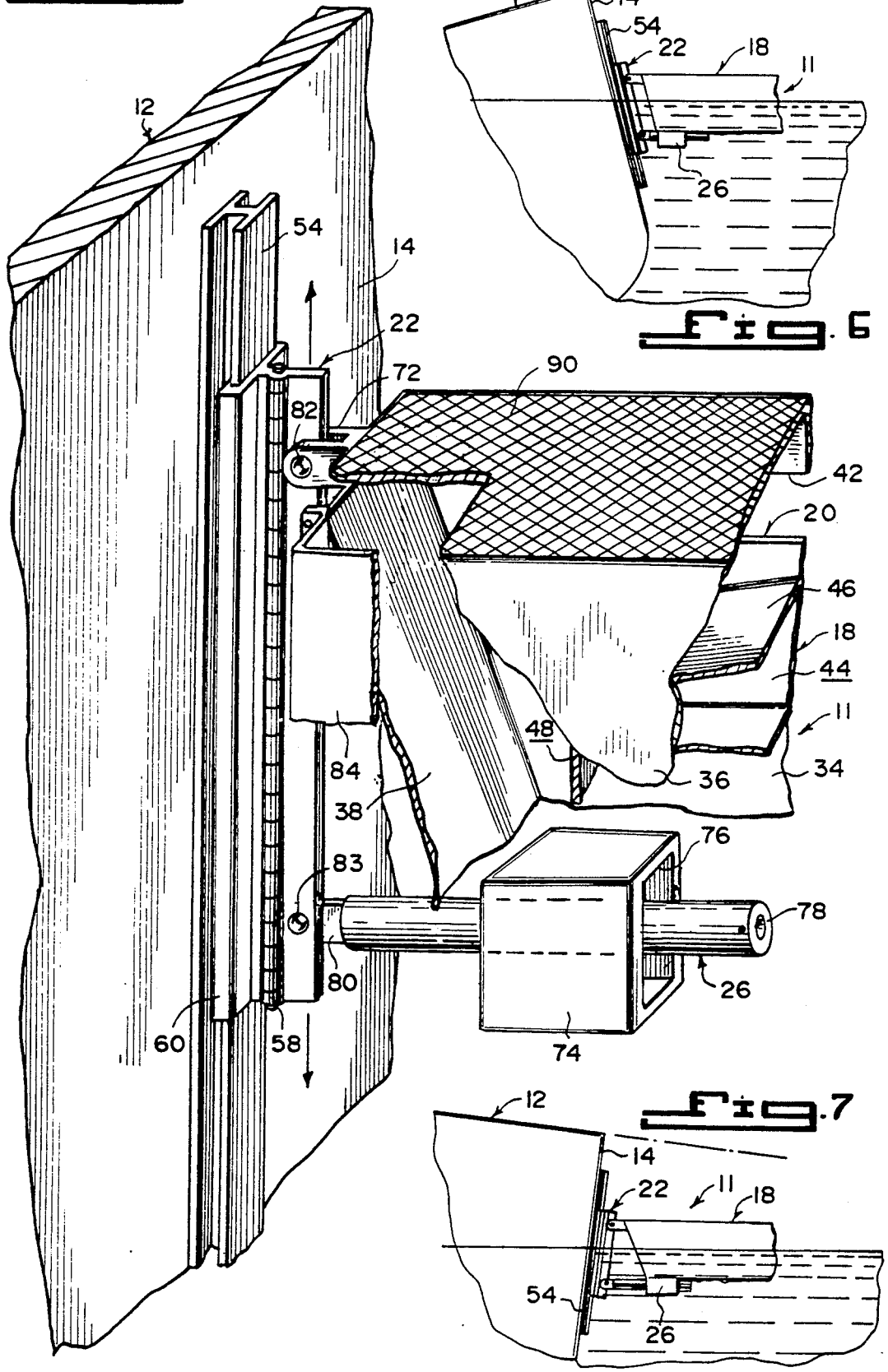

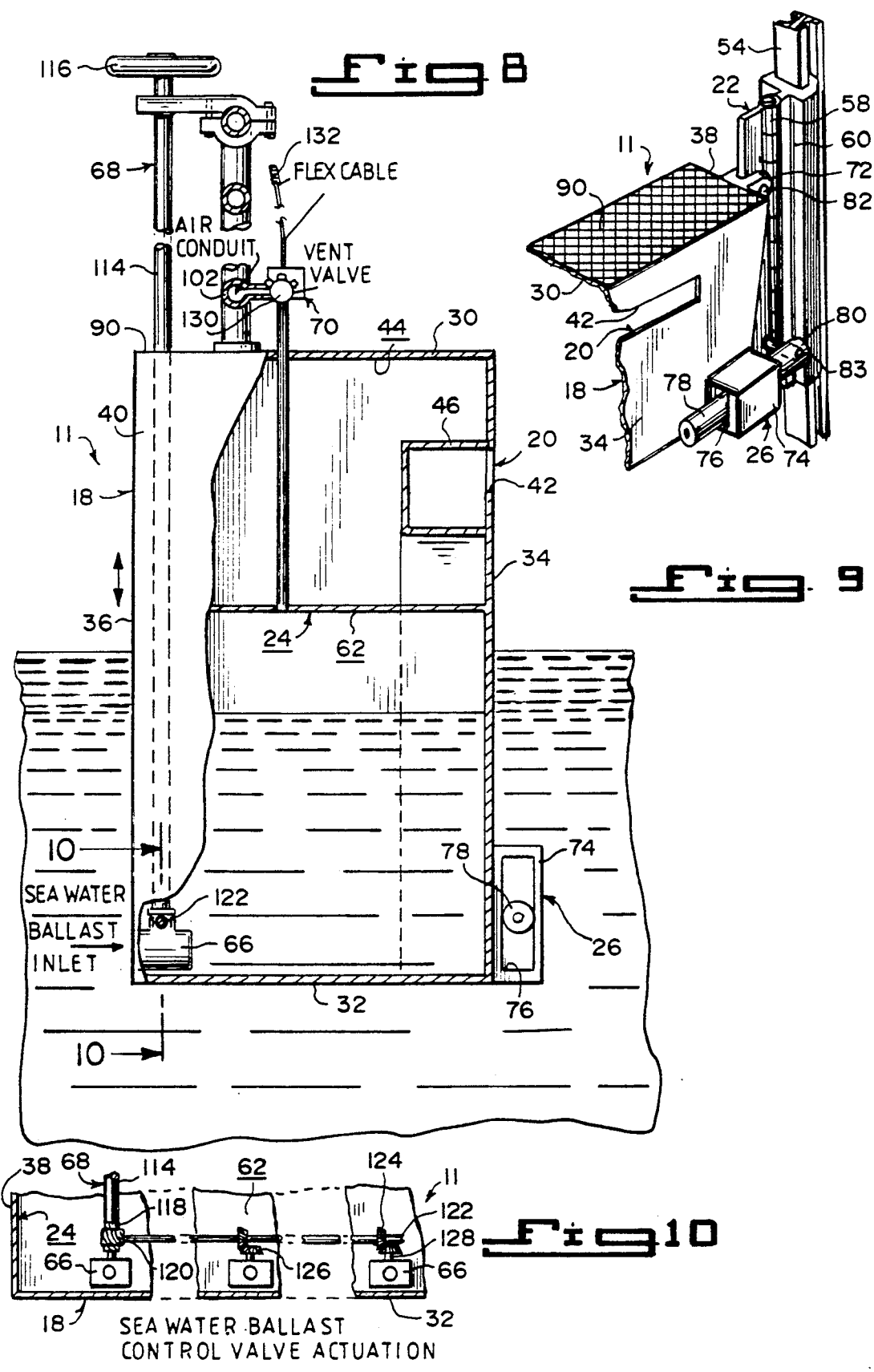

SEA OIL SCOOP WITH SEA EFFECT STABILITY HINGE

BACKGROUND OF THE INVENTION

1. Field of the Invention

The instant invention relates generally to oil removing devices and more specifically it relates to a sea oil scoop with sea effect stability hinge, which may be fitted to non-dedicated vessels.

2. Description of the Prior Art

Numerous oil removing devices have been provided in prior art that are adapted to remove the oil from the top surface of a body of water. While these units may be suitable for the particular purpose to which they address, they would not be as suitable for the purposes of the present invention as heretofore described.

SUMMARY OF THE INVENTION

A primary object of the present invention is to provide a sea oil scoop that will overcome the shortcomings of the prior art devices.

Another object is to provide a sea oil scoop that is a pair of scoops, with one hinged to the starboard side and the other to the port side of a vessel to remove oil from the top surface of a body of oil contaminated water, when in one instance the vessel travels forward and in another instance when the vessel is anchored and the tide and current drives the oil into the scoops.

An additional object is to provide a sea oil scoop that includes a mechanism to adjust the scoops with respect to the vessel and the water level so that the oil can be gathered within the scoops and pumped into the vessel.

A further object is to provide a sea oil scoop that is simple and easy to use and will retrofit to most tank vessels which have largo pumps.

A still further object is to provide a sea oil scoop that is economical in cost to manufacture and fast and simple to install.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 2A is a diagrammatic rear view, with parts broken away, taken in direction of arrow 2A in FIG. 1.

FIG. 2B is a rear perspective view with parts broken away of the structures shown in FIG. 2A.

FIG. 2C is a cross sectional view taken along line 2C—2C in FIG. 2B.

FIG. 2D is a diagrammatic front view with parts broken away, taken in direction of arrow 2D in FIG. 1.

FIG. 3 is an enlarged front detail view as indicated by arrow 3 in FIG. 2D.

FIG. 4 is a top view, with parts broken away, taken in direction of arrow 4 in FIG. 3.

FIG. 5 is an enlarged rear perspective view with parts broken away, showing the scoop connection to the hinge structure on the hull of the vessel.

FIG. 6 is a diagrammatic rear view with parts broken away, showing the vessel rolling towards the port side, while the scoop maintains a level position in the water.

FIG. 7 is a diagrammatic rear view similar to FIG. 6, showing the vessel rolling towards the starboard side, while the scoop maintains a level position in the water.

FIG. 8 is a diagrammatic end view with parts broken away, taken in direction of arrow 8 in FIG. 2D.

FIG. 9 is a front perspective view with parts broken away, showing the scoop connection to the hinge structure.

FIG. 10 is a cross sectional view taken along line 10—10 in FIG. 8.

DETAILED DESCRIPTION OF THE PREFERRED EMBODIMENTS

Figure 1:
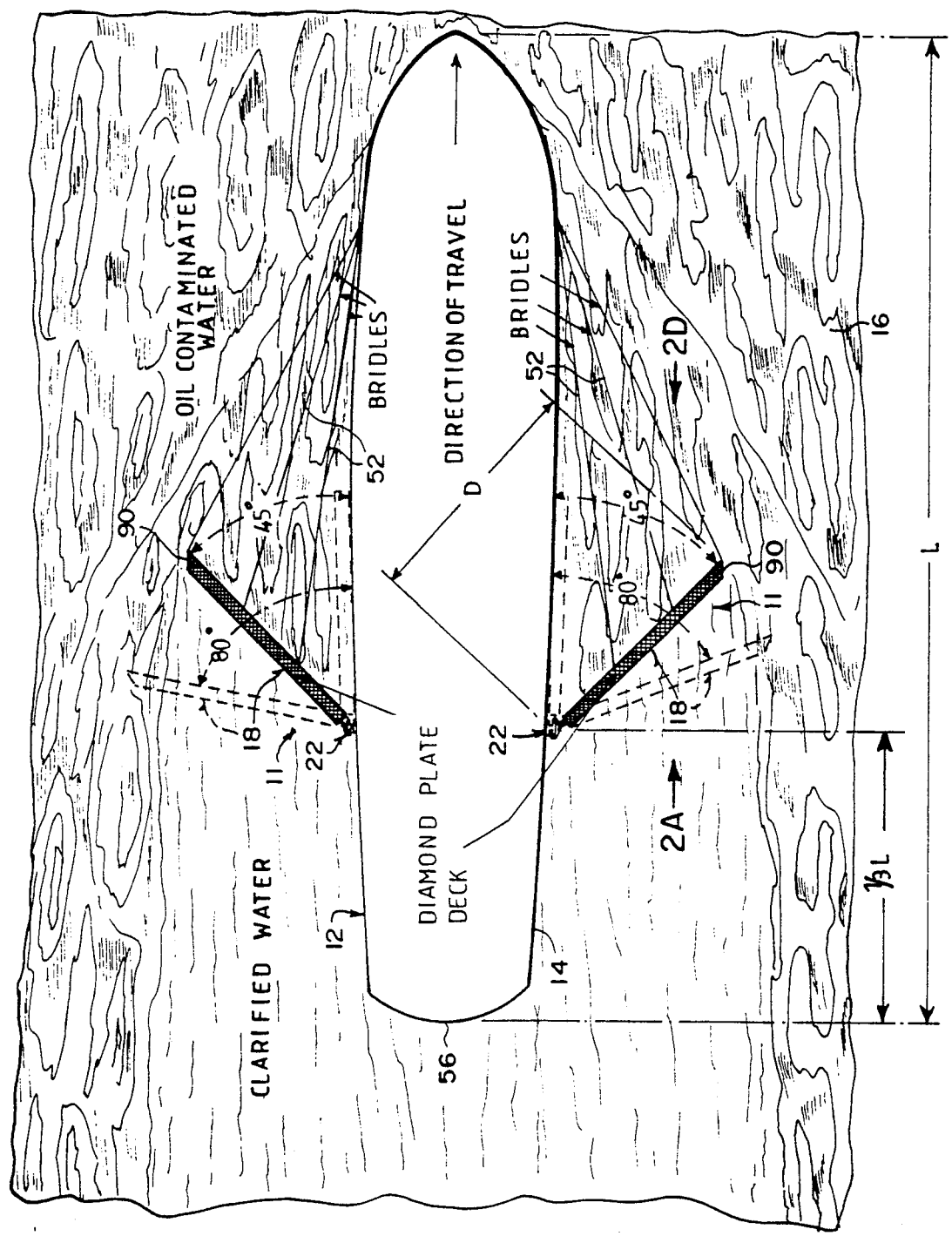
FIG. 1 is a diagrammatic top plan view of a vessel in a body of oil contaminated water with the instant invention being a scoop hinged to the starboard side and another scoop hinged to the port side of the vessel.

Turning now descriptively to the drawings, in which similar reference characters denote similar elements throughout the several views, the Figures illustrate a sea oil scoop 11 for a vessel 12 having a hull 14 in a body of oil contaminated water 16, which consists of a housing 18 having an oil inlet port 20. A mechanism 22 is for hinging the housing 18 to the side of the hull 14 of the vessel 12. The housing 18 can be angularly positioned with respect to the hull 14 of the vessel 12, to gather the oil from the top surface of the body of oil contaminated water 16 into the oil inlet port 20, when in one instance the vessel 12 travels forward and in another instance when the vessel 1 is anchored and the current in the water drives the oil past the vessel 12.

A mechanism 24 is for ballasting the housing 18 within the body of oil contaminated water 16 with respect to the hull 14 of the vessel 12, so that the oil inlet port 20 is placed at the top surface of the body of oil contaminated water 16.

A mechanism 26 is for horizontally stabilizing the housing 18 in a level position within the body of oil contaminated water 16 when the vessel 12 rolls to its starboard side and its port side as shown in FIGS. 6 and 7. A mechanism 28 is for pumping the oil out from the housing 18 and into the vessel 12.

The housing 18 is a generally elongated rectangular box shaped configuration having a top wall 30, a bottom wall 32, a front wall 34, a rear wall 36, an inner end wall 38 and an outer end wall 40, with the oil inlet port 20 being a generally elongated rectangular slot 42 in the front wall 34 just below the top wall 30. The housing 18 has an upper watertight chamber 44 and a sluice 46 position in the upper water tight chamber 44 behind the elongated rectangular horizontal slot 42 of the oil inlet port 20, which funnels downwardly towards the inner end wall 38 proximate the hull 14 of the vessel 12 and terminates into a sump area 48, so that the oil gathered therein will travel downwardly into the sump area 48.

A plurality of towing lugs 50, are spaced apart and attached to the underside of bottom wall 32 of the housing 18. A plurality of bridles 52 are also provided, with each extending from a forward location on the hull 14 of the vessel 12 to one of the towing lugs 50.

The hinging mechanism 22 includes an H-beam 54 affixed vertically to the side of the hull 14 of the vessel 12 approximately on third the distance forward from the stern 56 of the vessel 12. A piano hinge 58 has a C-shaped channel 60 that is slideably connected to one flange of the H-beam 54.

The ballasting mechanism 24 includes the housing 18 having a plurality of lower sea water ballast chambers 62 below the upper watertight chamber 44, with each ballast chamber 62 having a sea water ballast inlet port 64. A plurality of sea water ballast valves 66 are provided, with each located at one of the sea water ballast inlet ports 64. A mechanism 68 is for opening and closing the sea water ballast valves 66 to allow the sea water to enter the lower sea water ballast chambers 62. Mechanism 70 is for venting air from the lower sea water ballast chambers 62, so that the housing 18 can be lowered into the body of oil contaminated water 16.

The sea effect stabilizing hinge mechanism 26 includes the inner end wall 38 of the housing 18 being tapered inwardly from top to bottom. A first lug member 72 extends from the inner end wall 38 proximate the top wall 30 thereof. A sleeve 74 is affixed to the front wall 34 of the housing 18 proximate the bottom wall 32 thereof. The sleeve 74 has a slotted aperture 76 in a parallel relationship with the front wall 34 of the housing 18. A rod 78 has a second lug member 80 at one end thereof, whereby the rod 78 slideably fits through the slotted aperture 76 in the sleeve 74. A first pivot bolt 82 extends through the first lug member 72 and upper portion of the free end of the piano hinge 58. A second pivot bolt 83 extends through the second lug member 80 of the rod 78 and lower portion of the free end of the piano hinge 58.

A plate 84 is affixed to the free end of the piano hinge 58 which extends outwardly therefrom over a portion of the rear wall 36 of the housing 18, so as to cover the space between the tapered inner end wall 38 of the housing 18 and the free end of the piano hinge 58.

The pumping mechanism 28 includes a conduit 86 extending from the sump area 48 in the housing 18 and into the hull 14 of the vessel 12. A pump 88 is carried within the hull 14 of the vessel 12 and is fluidly connected into the conduit 86 to remove the oil from the sump area 48 in the housing 18.

The top wall 30 of the housing 18 includes a diamond plate deck 90 supported thereon and a rail 92 extending along the diamond plate deck 90, so that a person can walk out upon the diamond plate deck 90 and hold onto the rail 92. The housing 18 further includes a plurality of connectors 94, spaced apart and attached to the outer end wall 40, so that a containment boom (not shown) can be attached to the connectors 94 to help guide the oil into the oil inlet port 20 in the housing 18.

As best seen in FIGS. 2B and 2C, the sea water ballast valves opening and closing mechanism 68 includes each sea water ballast valve 66 being a sea water inlet ball valve 96. A plurality of double acting valve position actuators 98 are provided, with each actuator 98 fluidly connected to one of the sea water inlet ball valves 96. A sea water inlet valve selector/actuator 100 is fluidly connected to each double acting valve position actuator 98 through an air conduit 102 in the rail 92. A fluid pressure source 104, such as air or oil, is within the hull 14 of the vessel 12 and is fluidly connected to the sea water inlet valve selector/actuator 100. A ball valve control 106 on the vessel 12 is manually connected to the sea water inlet valve selector/actuator 100 for selectively operating each of the sea water inlet ball valves 96. A fluid pressure control 108 is on the vessel 12 and is fluidly connected between the fluid pressure source 104 and the sea water inlet valve selector/actuator 100, so as to control the flow of fluid pressure from the fluid pressure source 104 to the sea water inlet valve selector/actuator 100.

The air venting mechanism 70 includes a three way air vent valve 110 mounted on the air conduit 102 in the rail 92 and is fluidly connected to each of the lower sea water ballast chambers 62. An air vent control 112 is on the vessel 12 and is mechanically connected to the air vent valve 110 to open, close and vent the air vent valve 110.

As shown in FIGS. 2D, 8 and 10 the sea water ballast valves opening and closing mechanism 68 includes a vertical shaft 114 extending upwardly from one of the sea water ballast valves 66 through the diamond plate deck 90. A wheel 116 is connected to the upper end of the shaft 114, so that the shaft 114 can be manually rotated by a person standing on the diamond plate deck 90 and turning the wheel 116. A first worm gear 118 is on the lower end of the shaft 114. A second worm gear 120 is transversely in engagement with the first worm gear 118. A horizontal shaft 122 is affixed at one end to the second worm gear 120 and extends through each of the lower sea water ballast chambers 62 over and past each of the other sea water ballast valves 66. A first set of bevel gears 124 are provided with each mounted to the horizontal shaft 122 proximate one of the other sea water ballast valves 66. A second set of bevel gears 126 are also provided, with each having an axle 128 extending into one of the other sea water ballast valves 66 and is engagable at a right angle with each of the first bevel gears 124, so that by turning the wheel 116 the person can open and close all of the seat water ballast valves 66 together.

The air venting mechanism 70 includes a three way air vent valve 130 mounted on the air conduit 102 in the rail 92 and is fluidly connected to each of the lower sea water ballast chambers 62. A flex cable 132 is mechanically connected to the air vent valve 130, to open, close and vent the air vent valve 130.

Typically, one housing 18 is hinged to the starboard side and another housing 18 is hinged to the port side of the hull 14 of the vessel 12, as shown in FIG. 1. They can be angled at a maximum of eighty degrees from the hull 14, but a forty-five degree angle is preferably used for best results.

The chart below shows the typical effectiveness when scooping a sixty foot sweep when the housing 18 is at a forty-five degree angle.

| | TYPICAL EFFECTIVENESS WHEN SCOOPING SIXTY FOOT SWEEP | | |
|---|---|---|---|
| | Depth Below Surface (inches) | | |
| | 1 | 2 | 4 |
| Knots | Tons Per Minute | | |
| 1 | 15 | 30 | 60 |
| 2 | 30 | 60 | 120 |
| 4 | 60 | 120 | 240 |

LIST OF REFERENCE NUMBERS

11: sea oil scoop
12: vessel
14: hull of 12
16: oil contaminated water
18: housing
20: oil inlet port in 18
22: hinging mechanism 24: ballasting mechanism
26: sea effect stabilizing hinge mechanism
28: pumping mechanism
30: top wall of 18
32: bottom wall of 18
34: front wall of 18
36: rear wall of 18
38: inner end wall of 18
40: outer end wall of 18
42: elongated rectangular slot for 20
44: upper watertight chamber
46: sluice
48: sump area
50: towing lug
52: bridle
54: H-beam
56: stern of 12
58: piano hinge
60: C-shaped channel on 58
62: lower sea water ballast chamber
64: sea water ballast inlet port
66: sea water ballast valve
68: sea water ballast valve opening and closing mechanism
70: air venting mechanism
72: first lug member
74: sleeve
76: slotted aperture in 74
78: rod
80: second lug member
82: first pivot bolt
83: second pivot bolt
84: plate
86: conduit
88: pump
90: diamond plate deck on 30
92: rail
94: connector for a containment boom
96: sea water inlet ball valve
98: double acting valve position actuator
100: sea water inlet valve selector/actuator
102: air conduit in 92
104: fluid pressure source
106: ball valve control
108: fluid pressure control
110: three way air vent valve
112: air vent control
114: vertical shaft
116: wheel
118: first worm gear
120: second worm gear
122: horizontal shaft
124: first bevel gear
126: second bevel gear
128: axle
130: three way air vent valve
132: flex cable It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A sea oil scoop connected to a vessel having a hull in a body of oil contaminated water, which comprises:
   a) a housing configured as a generally elongated rectangle box shape having a top wall, a bottom wall, a front wall, a rear wall, an inner end wall and an outer end wall; with an upper water tight chamber, an oil inlet port in the form of a generally elongated rectangular horizontal slot in the front wall just below the top wall, and a sluice positioned in the upper watertight chamber behind the slot of the oil inlet port which funnels downwardly towards the inner end wall proximate the hull of the vessel and terminates into a sump area, so that the oil gathered therein will travel downwardly into the sump area; and with at least one lower ballasting chamber means for positioning the inlet port at the top surface of the body of oil contaminated water; and
   b) means for hinging said housing to the side of the hull of the vessel, so that said housing can be angularly positioned with respect to the hull of the vessel, to gather the oil from the top surface of the body of oil contaminated water into the oil inlet port, when in one instance the vessel travels forward and in another instance when the vessel is anchored and the current in the water drives the oil past the vessel.

2. A sea oil scoop as recited in claim 1, further including means for horizontally stabilizing said housing in a level position within the body of oil contaminated water when the vessel rolls to its starboard side and its port side.

3. A sea oil scoop as recited in claim 2, further including means for pumping the oil out from said housing and into the vessel.

4. A sea oil scoop as recited in claim 1, wherein said housing further includes:
   a) a plurality of towing lugs, spaced apart and attached to the underside of bottom wall of said housing; and
   b) a plurality of bridles, each extending from a forward location of the hull of the vessel to one of said towing lugs.

5. A sea oil scoop as recited in claim 4, wherein said hinging means includes:
   a) an H-beam affixed vertically to the side of the hull of the vessel approximately one third the distance forward from the stern of the vessel; and
   b) a piano hinge having a C-shaped channel slideably connected to one flange of said H-beam.

6. A sea oil scoop as recited in claim 5, wherein said ballasting means includes:
   a) said housing having a plurality of lower sea water ballast chambers below the upper watertight chamber, with each ballast chamber having a sea water ballast inlet port;
   b) a plurality of sea water ballast valves, each located at one of the sea water ballast inlet ports;

c) means for opening and closing said seat water ballast valves to allow the sea water to enter the lower sea water ballast chambers; and d) means for venting air from the lower sea water ballast chambers, so that said housing can be lowered into the body of oil contaminated water.

7. A sea oil scoop as recited in claim 6, wherein said sea effect stabilizing hinge means includes:
   a) the inner end wall of said housing being tapered inwardly from top to bottom;
   b) a first lug member extending from the inner end wall proximate the top wall thereof;
   c) a sleeve affixed to the front wall of said housing proximate the bottom wall thereof, said sleeve having a slotted aperture in a parallel relationship with the front wall of said housing;
   d) a rod having a second lug member at one end thereof, whereby said rod slideably fits through the slotted aperture in said sleeve;
   e) a first pivot bolt extending through said first lug member and upper portion of the free end of said piano hinge; and
   f) a second pivot bolt extending through said second lug member of said rod and lower portion of the free end of said piano hinge.

8. A sea oil scoop as recited in claim 7, further including a plate affixed to the free end of said piano hinged which extends outwardly therefrom over a portion of the rear wall of said housing, so as to cover the space between the tapered inner end wall of said housing and the free end of said piano hinge.

9. A sea oil scoop as recited in claim 8, wherein said pumping means includes:
   a) a conduit extending from the sump area in said housing and into the hull of the vessel; an
   b) a pump carried within the hull of the vessel and fluidly connected into said conduit to remove the oil from the sump area in said housing.

10. A sea oil scoop as recited in claim 9, wherein the top wall of said housing includes:
    a) a diamond plate deck supported thereon; and
    b) a rail extending along said diamond plate deck, so that a person can walk out upon said diamond plate deck and hold onto said rail.

11. A sea oil scoop as recited in claim 10, wherein said housing further includes a plurality of connectors, spaced apart and attached to the outer end wall, so that a contaminant boom can be attached to said connectors to help guide the oil into the oil inlet port in said housing.

12. A sea oil scoop as recited in claim 6, wherein said sea water ballast valves opening and closing means includes:
    a) each said sea water ballast valve being a sea water inlet ball valve;
    b) a plurality of double acting valve position actuator with each said actuator fluidly connected to one of said sea water inlet ball valves;

c) a sea water inlet valve selector/actuator fluidly connected to each said double acting valve position actuators through an air conduit in said rail;

d) a fluid pressure source within the hull of the vessel fluidly connected to said sea water inlet valve selector/actuator;

e) a ball valve control on the vessel manually connected to said sea water inlet valve selector/actuator for selectively operating each of said sea water inlet ball valves;

f) a fluid pressure control on the vessel fluidly connected between said fluid pressure source and said sea water inlet valve selector/actuator, so as to control the flow of fluid pressure from said fluid pressure source to said sea water inlet valve selector/actuator; and g) sea air venting means.

13. A sea oil scoop as recited in claim 12, wherein said air venting means includes:
    a) a three way air vent valve mounted on the air conduit in said rail and fluidly connected to each of the lower sea water ballast chambers; and
    b) an air vent control on the vessel mechanically connected to said air vent valve to open, close and vent said air vent valve.

14. A sea oil scoop as recited in claim 6, wherein said sea water ballast valves opening and closing means includes:
    a) a vertical shaft extending upwardly from one of said sea water ballast valves through said diamond plate deck;
    b) a wheel connected to the upper end of said shaft, so that said shaft can be manually rotated by a person standing on said diamond plate deck and turning said wheel;
    c) a first worm gear on the lower end of said shaft;
    d) a second worm gear transversely in engagement with said first worm gear;
    e) a horizontal shaft affixed at one end to said second worm gear and extending through each of the lower sea water ballast chambers over and past each of said other sea water ballast valves;
    f) a first set of bevel gears, each mounted to said horizontal shaft proximate one of said other sea water ballast valves; and
    g) a second set of bevel gears, each having an axle extending into one of said other sea water ballast valves and engagable at a right angle with each of said first bevel gears, so that by turning said wheel the person can open and close all of said sea water ballast valves together.

15. A sea oil scoop as recited in claim 14, wherein said air venting means includes:
    a) a three way air vent valve mounted on the air conduit in said rail and fluidly connected to each of the lower sea water ballast chambers; and
    b) a flex cable mechanically connected to said air vent valve to open, close and vent said air vent valve.

* * * * *